United States Patent [19]

Duffield

[11] 4,400,021

[45] Aug. 23, 1983

[54] REUSABLE TYPE HOSE END FITTING

[75] Inventor: Frederick R. Duffield, Mount Kuring-Gai, Australia

[73] Assignee: Frederick Duffield Pty. Limited, Mount Kuring-Gai, Australia

[21] Appl. No.: 290,281

[22] Filed: Aug. 6, 1981

[30] Foreign Application Priority Data

Aug. 19, 1980 [AU] Australia .................................. PE5117

[51] Int. Cl.³ .............................................. F16L 33/22
[52] U.S. Cl. ..................................... 285/247; 285/251; 285/259
[58] Field of Search ................ 285/247, 259, 251, 245, 285/246

[56] References Cited

U.S. PATENT DOCUMENTS

| 2,219,266 | 10/1940 | Hirsch ................................... 285/247 |
| 2,476,480 | 7/1949 | Burckle et al. .................. 285/259 X |
| 2,685,458 | 8/1954 | Shaw .................................. 285/259 X |
| 2,782,059 | 2/1957 | Stranberg ............................ 285/247 |
| 2,973,975 | 3/1961 | Ramberg et al. ................. 285/259 X |

FOREIGN PATENT DOCUMENTS 1453994  9/1966  France .................................. 285/247
618664  3/1961  Italy ..................................... 285/251

Primary Examiner—Thomas F. Callaghan
Attorney, Agent, or Firm—Ladas & Parry

[57] ABSTRACT

A reusable type hose end fitting comprising a through-bored stem portion and a ferrule portion which is removably screw-coupled to the stem portion. The stem portion has a first zone which is formed with a male screw thread and a second zone which locates within the bore of a hose. The ferrule portion has a first zone which is formed with a female thread for engagement with the male thread of the stem portion and a second zone which locates about the second zone of the stem portion to define a generally annular space in which an end portion of the hose locates when the fitting is assembled to the hose. The second zone of the stem portion is formed with four tapered regions and with cylindrical lands which separate adjacent ones of the tapered regions. The ferrule portion is formed in its second zone with three buttresses which are so disposed that, as the stem portion is advanced into the ferrule portion, a first one of the lands advances in an axial direction past all of the buttresses, a second one of the lands advances past two of the buttresses and a third one of the lands advances past one of the buttresses.

10 Claims, 7 Drawing Figures

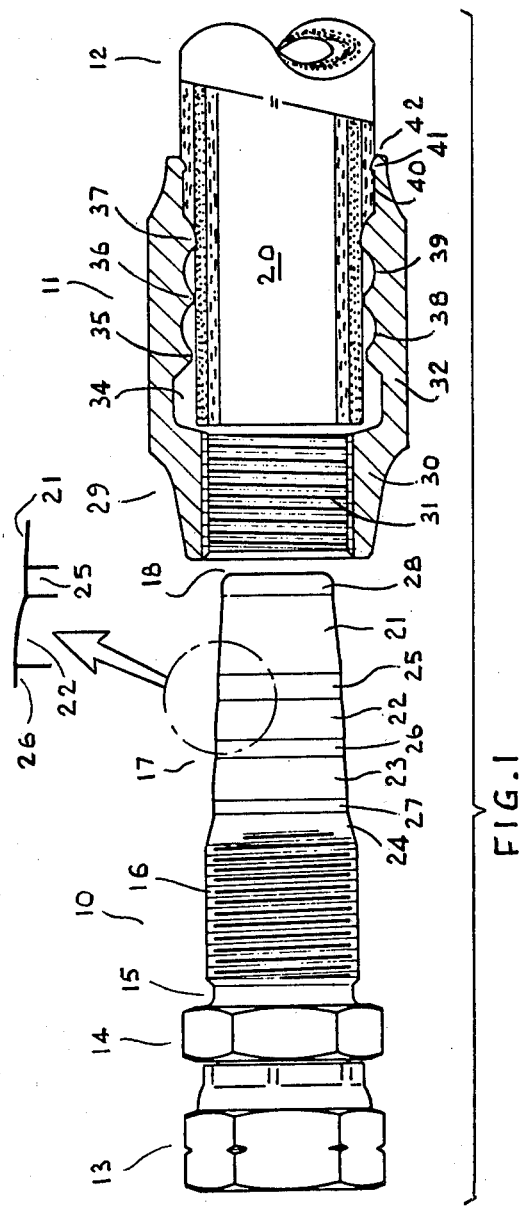
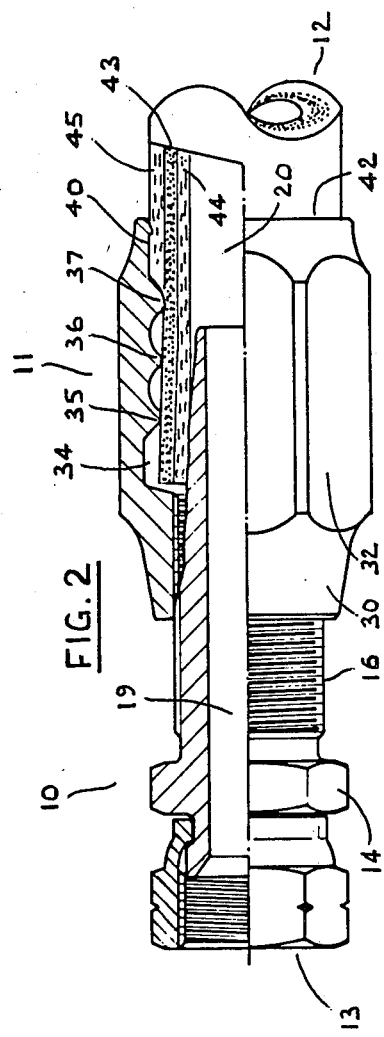

REUSABLE TYPE HOSE END FITTING

FIELD OF THE INVENTION

This invention relates to an end fitting for wire reinforced hoses and, in particular, to a so-called reusable end fitting which is suitable for use in conjunction with hoses having spirally wound wire reinforcement. By a "reusable" end fitting is meant one which has two body portions which are screw-coupled (rather than swage-coupled) in clamping relationship onto an end portion of a hose.

BACKGROUND OF THE INVENTION

Reusable hose end fittings normally have a stem portion which locates within the bore of the hose end and a ferrule portion which locates about the hose end, the ferrule portion being screw-coupled to the stem portion. During attachment of the end fitting to the hose, the hose end is located within the ferrule portion (with or without the outer covering of the hose end being pared to reveal and wire reinforcement) and the stem portion is then moved into the hose bore so that the hose wall is clamped between the stem and ferrule portions. Movement of the stem portion into the ferrule portion is effected by engaging male and female thread portions of the stem and ferrule portions respectively and by screwing the stem portion relative to the ferrule portion so that it is advanced in an axial direction into the ferrule portion. Considerable torque must be applied to the stem portion to effect the screwing operation, in order to overcome frictional and other forces which are exerted on the stem portion by the wall of the hose as it is being clamped between the stem and ferrule portions.

In order to facilitate insertion of the stem portion into the hose bore (whilst the wall of the hose is being clamped between the stem and ferrule portions) many hose end fittings have a stem portion which includes a tapered stem, the taper converging toward the free end of the stem portion which is first inserted into the hose bore and the taper having a substantially constant angle along its length. Thus, as the stem is forced into the bore of the hose, the hose wall is caused to flare outwardly and, as a consequence, the ferrule exerts a clamping (i.e., wedging and deforming) force on the hose wall. The forces exerted on the hose wall affect the torque required to advance the stem into the hose bore, and considerable torque must be applied (particularly in the case of large diameter wire-reinforced hoses) in order to overcome frictional resistance between the stem and the hose bore. The torque requirement increases with increasing advancement of the stem, due to the constantly increasing diameter of the tapered portion of the stem.

Some existing hose end fittings have tapered stems which are formed along a portion of their lengths with barbs or screw threads to aid gripping of the fitted hose end and to resist tensile detachment of the hose from the fitting. However in such cases the stems do have a substantially constant taper angle (embracing the crests of the barbs or screw-threads) and the above observations still apply.

SUMMARY OF THE INVENTION

In contrast with the prior art fittings, the present invention provides a hose end fitting in which the taper angle of the stem is not constant. Rather, the stem is formed along a portion of its length with spaced-apart tapered regions, with adjacent such regions being separated by lands. Also, the ferrule is formed with internal buttresses past which the lands move when the stem is advanced into the ferrule.

Thus, the present invention may be defined as providing a reusable type hose end fitting comprising a through-bored stem portion for location in part within the bore of a hose, and a ferrule portion for location about an end portion of the hose. The stem portion has a first zone which is formed with a male screw thread, and a second zone which locates within the bore of the hose when the fitting is secured to the hose end. The ferrule portion has a first zone which is formed with a female screw thread which is engageable with the male thread on the stem portion, and a second zone which locates about the second zone of the stem portion to define a generally annular space is which the hose wall is located when the fitting is secured to the hose end. The end fitting is characterised in that the second zone of the stem portion is formed with at least three regions which taper convergently toward the end of the stem which is first inserted into the hose bore, with adjacent tapered regions being separated by a land, having a length which is less than that of the adjacent tapered portion: is further characterised in that the ferrule portion is formed in its second zone with at least two annular buttresses which are spaced apart by a distance which is approximately equal to the spacing between the lands, and which are so disposed that, as the stem portion is advanced into the ferrule portion, each land advances in an axial direction past at least one of the buttresses.

It has been found that a hose end fitting which meets the above definition requires less torsional force to assemble the fitting to a hose end than a comparable prior art type of hose fitting which has a constantly tapering stem portion, at least in respect of end fittings which are intended to be used with hoses having a bore diameter up to at least 2.5 cm.

PREFERRED FEATURES OF THE INVENTION

The second zone of the stem portion preferably includes three lands and, most preferably, has four such lands, including one immediately adjacent the free end of the stem portion. Also, three buttresses are preferably provided in the ferrule portion. The buttresses are preferably disposed such that, when the ferrule portion is fully assembled to the stem portion, the buttresses do not align with the lands on the stem portion.

Also, where two or more lands are provided on the stem, at least one of the lands preferably has a width (in the axial direction of the stem) which is different from that of the other land or lands. Alternatively, the lands may have a constant width and the spacing between the buttresses may be different.

Additionally, the lands may each be formed with at least one barb or be furnished with a comparatively rough surface.

The tapered regions of the stem portion may comprise straight tapered regions or, preferably, such regions may approximate to a taper but have an arcuate profile.

The lands preferably have zero taper, so as to form cylindrical portions of the stem, but they may have some degree of taper less than or oppositely directed to the tapered regions of the stem. The tapered regions of the stem blend into the adjacent lands and may be considered (in profile) as a series of wedges.

The invention will be more fully understood from the following description of a preferred embodiment of a hose end fitting, the description being given with reference to the accompanying drawings.

BRIEF DESCRIPTION OF THE DRAWINGS

FIG. 1 shows an elevation view of the hose end fitting components about to be coupled together, with the ferrule part of the fitting and a hose end being shown in sectional elevation, FIG. 2 shows a half-sectional elevation view of the fitting components and hose end at the commencement of coupling of the components.

DETAILED DESCRIPTION OF THE INVENTION

Figure 3:
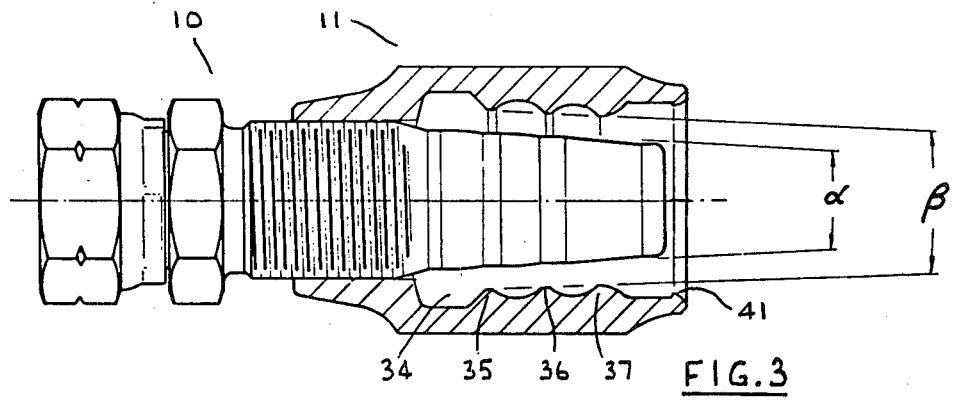
FIGS. 3 to 6 show elevation views of the fitting components in progressive stages of assembly, with the end portion of the hose being omitted for the sake of illustration.

As illustrated, the hose-end fitting comprises two components, a stem portion 10 and a ferrule portion 11. The two components are screw-coupled in a manner to be described and, when so coupled, serve to clamp an end portion of a hose 12.

The stem portion 10 has a forward end 13 which comprises a female coupling, but it might equally comprise a male coupling, elbow, flange or the like. Thus, the salient features of the invention reside in the part of the stem portion 10 which trails the forward end 13. To the rear of the female coupling 13 is a hexagonal shoulder 14 to which a spanner may be applied during assembly of the fitting components 10 and 11 to the hose 12. Then, following the hexagonal shoulder 14 are a thread relief groove 15, a male screw-threaded first zone portion 16 and a second zone portion 17 which decreases progressively in diameter toward the free end 18 of the stem. An axially extending bore 19 passes through the length of the stem portion and forms an extension of the bore 20 of the hose 12 when the fitting is secured to the hose end.

The second zone portion 17 of the stem 10 comprises four regions 21 to 24 of increasing diameter which are separated by non-tapered sections or lands 25, 26 and 27. Also, a non-tapered land 28 is disposed immediately adjacent the free end 18 of the stem.

The resions 21 to 24 of increasing diameter might be regarded generally as tapered regions and are herein referred to as such. The tapered region 21 is straight-tapered and thus has a frusto-conical form. The tapered regions 22 and 23 have a convex form or, expressed otherwise, have an arcuate profile as shown in the arrowed scrap view associated with FIG. 1. The gradient of the arcuate profile is steeper at the smaller-diameter end of the respective regions than at the larger diameter end, and the larger-diameter end of each of the regions 22 and 23 blends into the respective adjacent lands 26 and 27.

The lands 25 to 27 have progressively decreasing widths. Also, whereas the tapered regions 22 and 23 have widths which are approximately equal, the tapered region 21 has a greater width.

The solid angle α which embraces the three tapered sections 21 to 23 is approximately 6° to 8°, as indicated in FIG. 3. However it will be understood that such taper angle may be varied from one end fitting to another, depending upon the size and material composition of the hose 12 to which the end fitting is to be applied. Also, it will be appreciated that the included angle of the gradient of a portion of each of the sections 22 and 23 will be something greater than 6° to 8°, in the case of the illustrated embodiment, due to the presence of the non-tapered lands 25, 26 and 27.

Figure 4:
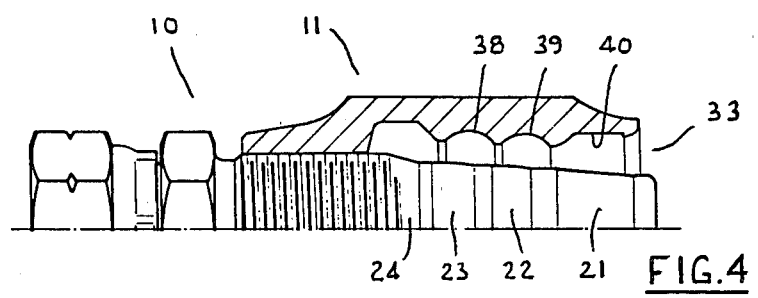
Figure 5:
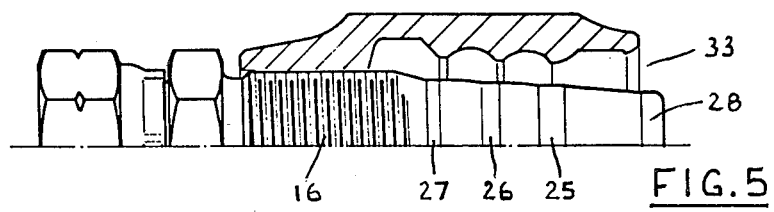

The ferrule portion 11 comprises a first zone 29, which includes a nose section 30 having an internally threaded bore 31, and a second zone 32. The threaded bore 31 is engageable with the male thread 16 on the stem portion and the second zone 32 locates coaxially about the stem portion, when the stem and ferrule portions 10 and 11 are coupled, to define an annular spaces 33 (FIGS. 4 to 6) in which the wall of the hose 12 locates.

Considering now the construction of the ferrule portion 11 in more detail: It is produced from hexagonal bar stock and the forward end or nose portion 30 is in the form of a frusto-conical region. The female threaded bore 31 extends through the nose portion 30 and opens into a region 34 of enlarged diameter. Then, following the region 34, a series of three buttresses 35, 36 and 37 are provided. The intermediate buttress 36 is separated from the other two buttresses by arcuate reliefs 38 and 39. The reliefs 38 and 39 each have a depth which is less than the depth of the region 34, and the buttresses 35 and 36 each have a flat crest. The remaining buttress 37 has an arcuate crest which extends to a trailing recess 40, and such recess terminates in an annular nib 41 adjacent the free end 42 of the ferrule portion.

Figure 6:
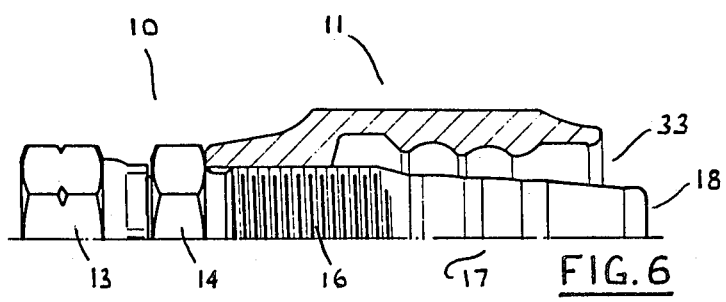
Figure 7:
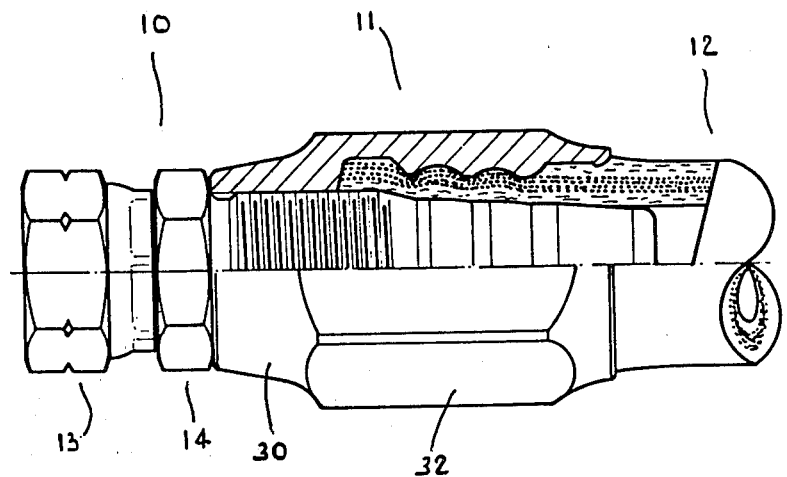
FIG. 7 shows a half-sectional elevation view of the fully assembled fitting, with the end portion of the hose shown clamped in position between the fitting components.

As can best be seen from FIGS. 6 and 7, the ferrule portion has an overall length which is less than the length of the stem portion 10 between the hexagonal shoulder 14 and the end 18.

The crests of the buttresses 35 to 37 are not parallel to the axis of the ferrule portion but, rather, are inclined at an angle to the axis. For the fitting which is illustrated in the drawings, the crests of the buttresses lie around an imaginary cone which subtends an angle β of 4°, as shown in FIG. 3. Thus, the radial distance between the solid angle α of the stem portion and the cone angle β of the ferrule portion decreases from the rearward end 18 to the forward end 14 of the stem portion, to correspond with the reduction in the wall thickness of the hose 12 as the hose is flared outwardly by the stem portion.

The end fitting might be formed in a manner that renders it suitable for various types of hoses and, when in the form as above described, is suitable for attachment to a synthetic rubber hose 12 having a spirally wound wire reinforcement 43 lcoated between inner and outer wall portions 44 and 45 of the hose.

When assembling the end fitting to the hose 12, the outer covering 45 is first pared from the hose to reveal the wire reinforcement 43 for a length corresponding approximately to one-half the length of the ferrule. That is, so that the hose end can be butted against the rearward wall of the nose portion and so that the buttresses contact the wire reinforcement, as shown in FIGS. 1 and 2.

Thereafter, the end portion of the hose is pushed into the ferrule portion 11 as shown in FIG. 1, and the stem portion 10 is moved into the ferrule portion 11 as shown in FIG. 2. When the male and female threads 16 and 31 engage, the stem portion is rotated relative to the ferrule portion so that the stem portion is progressively advanced into the ferrule portion in an axial direction. Continued advancement causes the hose bore 20 to be expanded and causes flaring of the hose wall. At the same time, the hose wall is clamped between the stem 17 and the buttresses 35 to 37.

Due to the clamping forces, the hose material, is induced to flow into the recesses 34, 38 and 39 of the ferrule and to deform the wire reinforcement into the recesses such that it follows a serpentine path. Also, the nib 40 at the free end of the ferrule is caused to bite into the outer covering of the hose to form a weather-tight seal.

As is best seen from FIGS. 3 to 6, continued advancement of the stem portion into the ferrule portion results in the non-tapered lands 28 and 25 to 27 being moved serially past the buttresses 35 to 37. It has been found that this action permits the application of less torque than would otherwise be required to advance a stem of constant taper through the ferrule.

As the tapered region 22 moves past the buttress 35, the inner wall 44 of the hose tends to flow and force the wire reinforcement 43 into the acruate recess 38. Then, as the stem continues to advance, the land 26 serves to "hold" the relevant portion of the hose wall in the recess 38, without applying increasing force to the hose wall, whilst the tapered region 22 proceeds then to force the hose material and reinforcement into the next recess 39 and the following tapered region 23 moves into the zone of the recess 38. Thus, progressive loading of the hose wall occurs until the stem is fully inserted into the ferrule. When the stem is fully inserted the tapered region 24 serves to lock the wire reinforcement against the buttress 35 and the tapered regions 22 and 23 create restrictive annuli with the buttresses 36 and 37.

Variations and modifications may be made in the hose fitting as above described without departing from the scope of the invention as defined in the following claims.

What is claimed is:

1. In a reusable-type hose end fitting having a through-bored stem portion for location in part within the bore of a hose, and a ferrule portion for location about an end portion of the hose, the stem portion having a first zone which is formed with a male screw thread and a second zone which locates within the bore of the hose when the fitting is secured to the hose end, the ferrule portion having a first zone which is formed with a female screw thread which is engageable with the male thread on the stem portion and a second zone which locates about the second zone of the stem portion to define a generally annular space in which the hose wall is located when the fitting is secured to the end portion of the hose; the improvement which is characterized in that the second zone of the stem portion is formed with at least three tapered regions which taper convergently toward the end of the stem portion, in that adjacent tapered regions are separated by a land with a length in the axial direction of the stem portion which is less than the length of the adjacent tapered regions, and in that the ferrule portion is formed in its second zone with at least two annular buttresses which are spaced apart in the axial direction of the ferrule portion by a distance approximately equal to the spacing between the lands of the stem portion and which are so disposed that, as the stem portion is advanced into the ferrule portion, each land advances in an axial direction past at least one of the buttresses.

2. An end fitting as claimed in claim 1 wherein the second zone of the stem portion is formed adjacent its end with another land.

3. An end fitting as claimed in claim 1 wherein the buttresses are so disposed that, when the ferrule portion is fully assembled to the stem portion, the buttresses do not align with the lands on the stem portion.

4. An end fitting as claimed in claim 1 wherein at least one of the lands has a width in the axial direction of the stem which is different from the width of the other lands.

5. An end fitting as claimed in claim 1 wherein the ferrule portion is formed in its second zone with three spaced-apart said buttresses, and wherein first and second ones of the buttresses are spaced-apart in an axial direction by a distance different from the spacing between the second and third ones of the buttresses.

6. An end fitting as claimed in claim 1 wherein or at least one of the lands is formed with an annular protrusion or a textured surface.

7. An end fitting as claimed in claim 1 wherein the tapered regions have a conical form.

8. An end fitting as claimed in claim 1 wherein at least one of the tapered regions has a generally conical form which is arcuate in profile.

9. An end fitting as claimed in claim 1 wherein each said land is cylindrical.

10. In a reusable-type hose end fitting having a through-bored stem portion for location in part within the bore of a hose, and a ferrule portion for location about an end portion of the hose, the stem portion having a first zone which is formed with a male screw thread and a second zone which locates within the bore of the hose when the fitting is secured to the hose end, the ferrule portion having a first zone which is formed with a female screw thread which is engageable with the male thread on the stem portion and a second zone which locates about the second zone of the stem portion to define a generally annular space in which the hose wall is located when the fitting is secured to the end portion of the hose; the improvement which is characterized in that the second zone of the stem portion is formed with at least three tapered regions which taper convergently toward the end of the stem portion, in that adjacent tapered regions are separated by a land with a length in the axial direction of the stem portion which is less than the length of the adjacent tapered regions, in that the ferrule portion is formed in its second zone with at least two annular buttresses which are spaced apart in the axial direction of the ferrule portion by a distance approximately equal to the spacing between the lands of the stem portion and which are so disposed that, as the stem portion is advanced into the ferrule portion, each land advances in an axial direction past at least one of the buttresses, in that the crests of the buttresses have a diameter which increases in the direction of increasing diameter of the stem portion, and in that the crests of the buttresses lie around a first imaginary cone which subtends an angle $\beta$ which is smaller than an angle $\alpha$ of a second imaginary cone substantially along which the tapered regions of the stem portion are disposed.

* * * * *